Nov. 20, 1956    E. T. WAHLBOM    2,771,334
PORTABLE BAR
Filed June 11, 1953    3 Sheets-Sheet 1
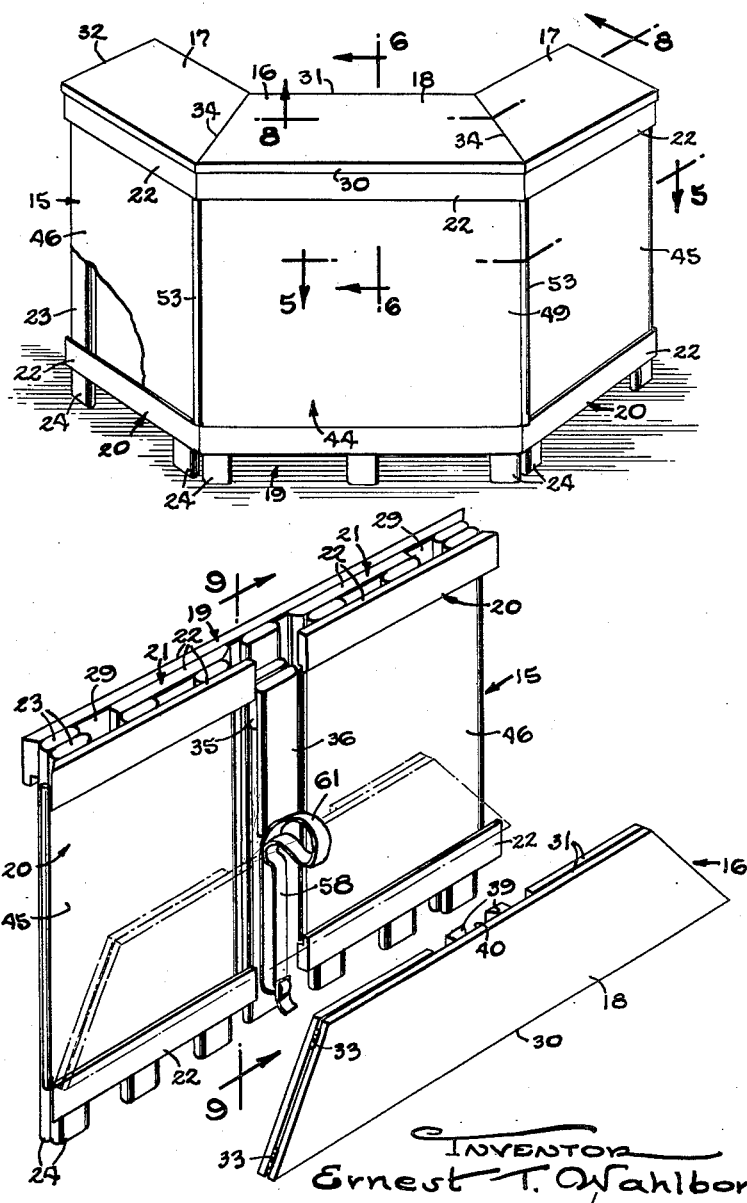

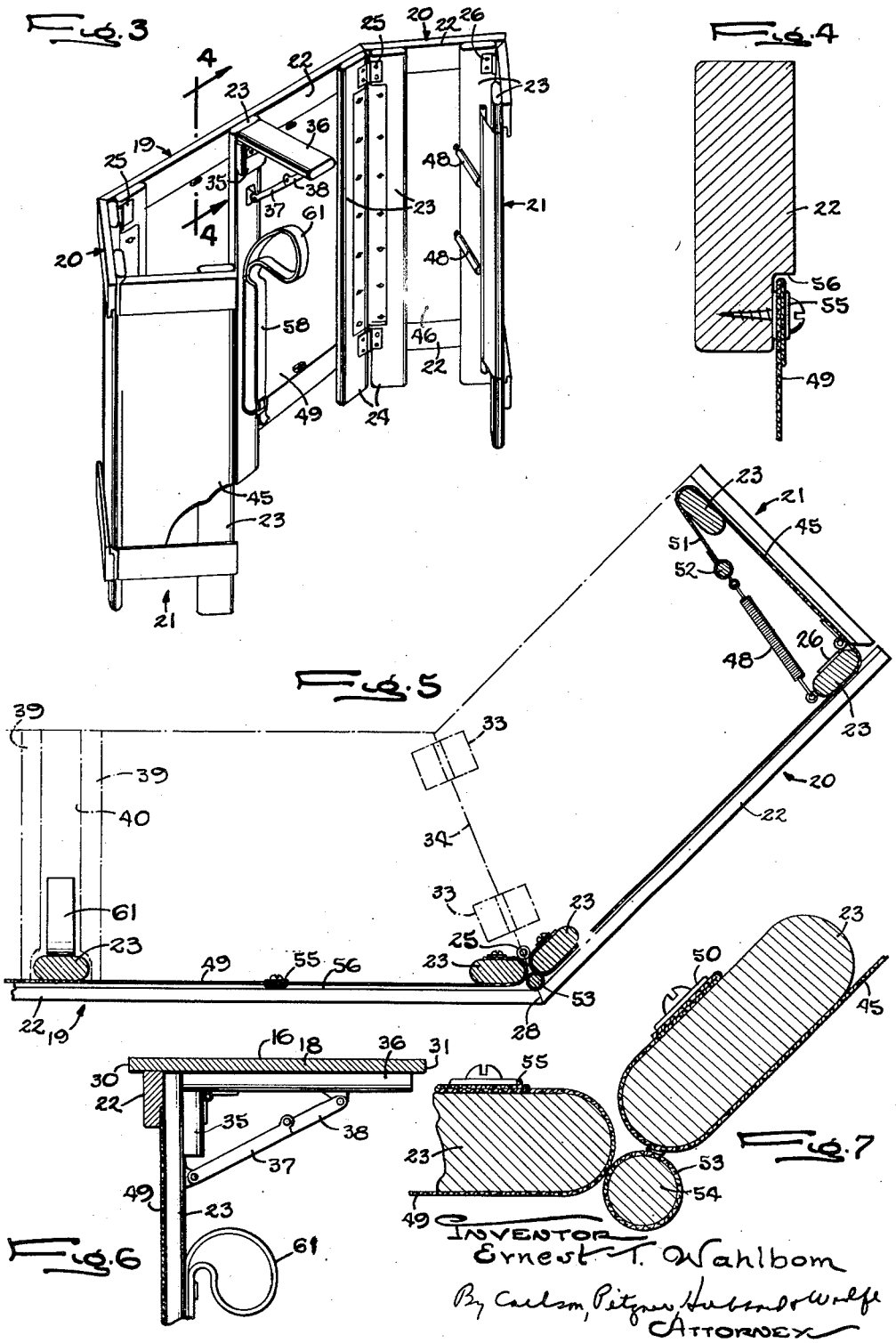

Nov. 20, 1956 — E. T. WAHLBOM — 2,771,334
PORTABLE BAR
Filed June 11, 1953 — 3 Sheets-Sheet 3
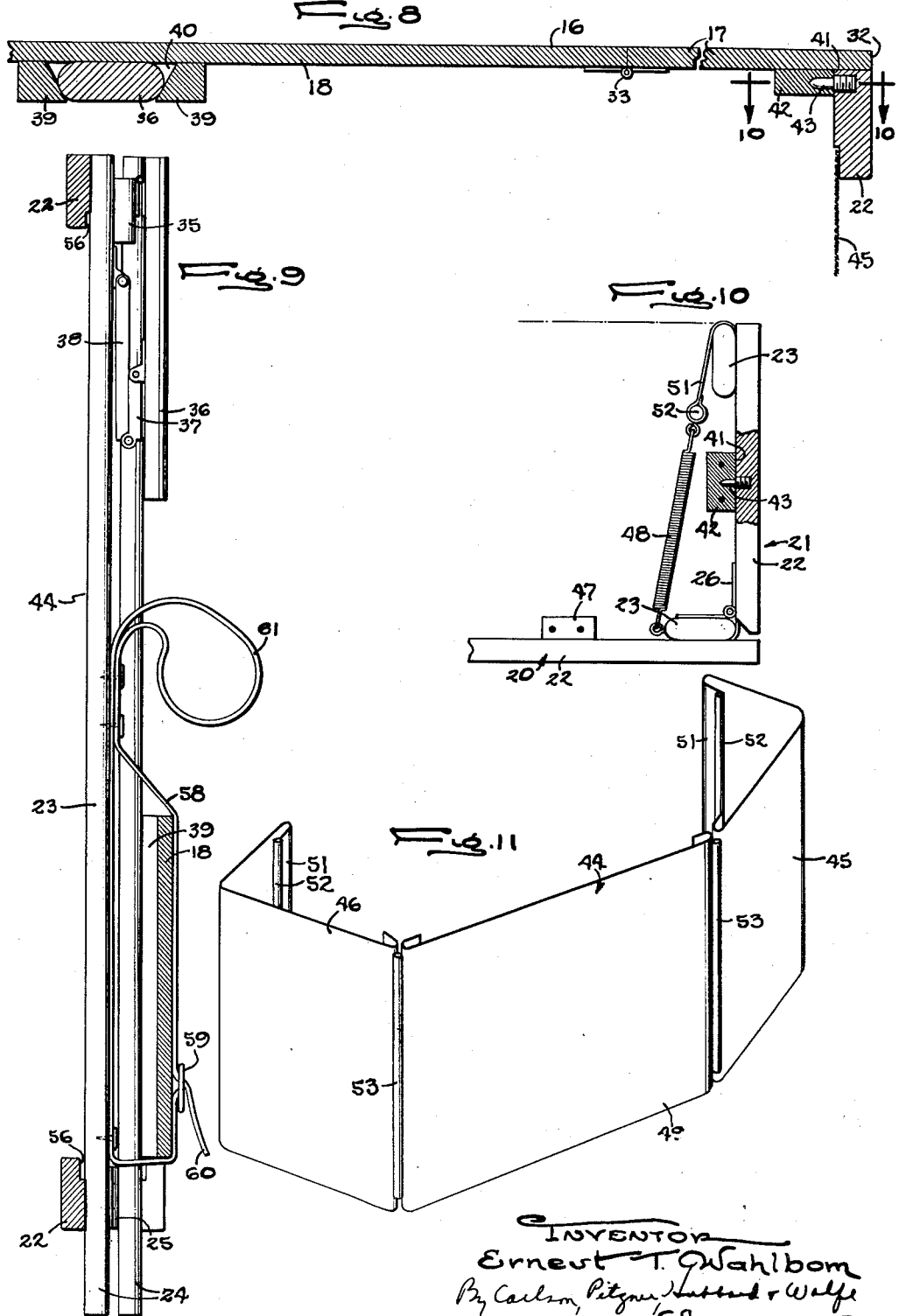
INVENTOR
Ernest T. Wahlbom
By Carlson, Pitzner, Hubbard & Wolfe
ATTORNEY

United States Patent Office 2,771,334
Patented Nov. 20, 1956

2,771,334

PORTABLE BAR

Ernest T. Wahlbom, Rockford, Ill., assignor of one-half to Bennett T. Griggs, Rockford, Ill.

Application June 11, 1953, Serial No. 360,880

8 Claims. (Cl. 312—140.4)

This invention relates generally to portable refreshment bars and, more particularly, to a portable bar of the type having a collapsible framework or body comprising a plurality of frames or sections and adapted to support a flat counter in a generally horizontal position when the framework is extended.

One object of the invention is to construct the framework and the counter of a bar of the above character in a novel manner to provide a rigid, sturdy construction which is not subject to tipping when assembled, but which may be collapsed in a few simple operations to form an easily transportable unit.

Another object is to construct the framework of sections of different widths hinged together in a novel manner to enable the sections to be folded together and lie flat against each other when collapsed.

A further object is to provide a flexible covering for the framework which is tensioned in a novel manner to hold the parts of the bar assembled while maintaining the covering taut to provide a pleasing appearance.

A more detailed object is to tension the flexible covering in a direction to urge the framework sections toward their collapsed positions and into engagement with stops located on the counter to position the latter and the framework sections properly in their assembled positions.

Other objects and advantages of the invention will become apparent from the following detailed description taken in connection with the accompanying drawings, in which—

Figure 1 is a fragmentary perspective view of an assembled portable bar embodying the novel features of the present invention, some of the parts being broken away.

Fig. 2 is an exploded perspective view of the bar in its collapsed condition.

Fig. 3 is a perspective view of the framework or body of the bar showing the hinged sections in their open positions.

Fig. 4 is a sectional view taken along the line 4—4 of Fig. 3.

Fig. 5 is a fragmentary sectional view taken along the line 5—5 of Fig. 1 with the counter shown schematically.

Fig. 6 is a fragmentary sectional view taken along the line 6—6 of Fig. 1.

Fig. 7 is an enlarged fragmentary sectional view similar to Fig. 5.

Fig. 8 is a fragmentary sectional view taken along the line 8—8 of Fig. 1.

Fig. 9 is a sectional view taken along the line 9—9 of Fig. 2.

Fig. 10 is a fragmentary sectional view taken along the line 10—10 of Fig. 8.

Fig. 11 is a perspective view of the flexible covering for the sections of the body.

The improved portable bar shown in the drawings to illustrate the present invention is of the type having a body 15 and a flat counter 16 which are separate parts adapted to be assembled as shown in Fig. 1 with the body upright and the counter resting in a horizontal position on top of the body. Generally, the counter comprises a plurality of flat sections in the form of panels or boards 17 and 18 hinged together to swing back and forth relative to each other between extended positions in which the panels lie in a common plane as shown in Fig. 1 and collapsed positions flat against each other as shown in Figs. 2 and 9.

The body 15 also comprises a plurality of hinged sections, herein five, in the form of rectangular frames 19, 20 and 21 each having a pair of vertically spaced horizontal rails 22 and one or more vertical posts 23 spanning and secured as by screws to the rear sides of the rails at the ends of the latter. At their lower ends, the posts project downwardly beyond the lower rail to form feet 24. In this instance, three posts connect the rails of a center frame 19, one at each end and one at the centers of the rails. Two intermediate frames 20 each have only two posts located at opposite ends of the rails of the frame, the posts extending along the inner vertical edges of the respective intermediate frames being connected by hinges 25 to the posts extending along the opposite vertical edges of the center frame. For a purpose to appear later, the rails of each end frame 21 are spanned by only one post 23 located along the outer side edge of the frame and the inner ends of the rails are hinged as indicated at 26 directly to the posts extending along the outer side edges of the intermediate frames 20.

When the frames 19, 20 and 21 of the body are swung about their hinges and into their extended positions, the intermediate frames 20 are tilted back at a slight angle away from the plane of the center frame as shown in Fig. 5. Forward swinging of the intermediate frames to such inclined positions with respect to the center frame is limited by engagement between stop surfaces 28 formed on the adjacent ends of the rails 22 of the center and intermediate frames (Fig. 5). The end frames 21 in their extended positions extend perpendicularly of the plane of the intermediate frames. Outward swinging of the end frames is limited by engagement between the inner ends of the rails on the end frames and the back sides of the intermediate frame rails. It will be seen that the frames in their extended positions define a vertical wall of generally U-shaped cross section. Thus, the center frame 19 constitutes the closed end of the U and the intermediate and end frames 20 and 21 constitute the laterally spaced legs. Although the latter are not parallel, the cross sectional shape of the body is considered to be generally U-shaped. Since both the intermediate and the end frames extend rearwardly from the center frame, the body has substantial depth and is not subject to tipping forwardly.

In accordance with one aspect of the invention, the frames 19, 20 and 21 are made of different widths horizontally to enable the frames to be folded together in a novel manner and provide a thin easily transportable unit when in their collapsed positions while providing a rigid support for the counter 16 when in their extended positions. For this purpose, the width of each intermediate frame 20 is made equal to or narrower than one-half of the width of the center frame 19 to enable the intermediate frames to be folded into collapsed positions flat against opposite halves of the center frame. Also, the end frames 21 are made narrower than the intermediate frames so that the end frames may be swung into collapsed positions against the rear sides of the intermediate frames and lie between the latter and the center frame as shown in Fig. 2.

In this instance, each intermediate frame 20 is narrower than one-half of the width of the center frame 19 and, in its collapsed position, extends up to the center post 23 of the center frame. The end frames 21 extend inwardly from the outer vertical edges of the intermediate frames and short of the posts 23 along the inner side edges of the intermediate frame and each are received in a flat vertically extending recess 29 (Fig. 2) disposed between the center frame and the adjacent intermediate frame and having a thickness equal to the sum of the thicknesses of the posts on the frames defining the recess. By making the posts 23 and the rails 22 of the same thickness and by hinging the inner ends of the rails of each end frame directly to the outer post of the adjacent intermediate frame, the thickness of the joint between the end and intermediate frames is equal approximately to the thickness of the recess 29. Thus, the intermediate frames, in their collapsed positions, lie in a common plane parallel to the plane of the center frame as shown in Fig. 2 with the end frames fitting into the recesses 29 between the center and intermediate frames.

When the panels 17 and 18 of the counter are in their extended positions, they lie in a common plane as described above and form an elongated flat surface whose forward and rear edges 30 and 31 are parallel and whose forward edge 30 and end edges 32 correspond in shape to the cross section of the extended body 15 and are adapted to rest on the top of the latter. When collapsed, two panels 17 constituting the end portions of the counter are folded flat against the bottom side of the third or center panel 18 to form an enlongated flat unit adapted to lie flat against the collapsed body within the periphery of the latter as shown in Fig. 2. In this instance, the center panel 18 is an equilateral trapezoid whose largest parallel edge rests on and is approximately equal in length to the top rail 22 of the center frame. Each of the end panels 17 is a trapezoid which is shorter than half of the length of the center panel so as to lie along one half of the latter in the collapsed positions of the panels. The outer end of each end panel is perpendicular to its parallel edges and forms one end edge 32 of the counter. At their inner ends, the end panels are connected to the opposite ends of the center panel by hinges 33 attached to the bottom sides of the panels. The line 34 of division (Fig. 5) between each end panel and the center panel bisects the angle between the front edges of the two panels so that the parallel edges thereof are flush when the end panel is folded flat against one-half of the bottom side of the center panel as shown in Fig. 2.

To increase the rigidity of the assembled bar, the center panel 18 is supported by a collapsible bracket 36 mounted on the center post 23 of the center frame 19 and extending horizontally and rearwardly from the center frame along the underside of the center panel. In this instance, the bracket 36 comprises a flat elongated bar hinged at its inner end on a block 35 secured to the center post of the center frame 19. The bracket swingable between a vertical collapsed position along the back of the latter is shown in Figs. 2 and 9 and an extended horizontal position (see Figs. 3 and 6) in which the bracket extends almost to the rear edge 31 of the center panel. To hold the bracket in its extended position, a toggle comprising two members 37 and 38 pivotally connected at opposite ends to the bracket and its supporting post 23 is adapted to lock in an overcenter position when the bracket is horizontal.

The bracket 36 also cooperates with a guide 39 on the underside of the center panel 18 to locate the counter 16 properly on the top of the body 15. In this instance, the guide comprises two elongated blocks disposed perpendicularly with respect to the forward edge of the center panel and fixed to the underside of the latter to define a channel 40 adapted to receive the bracket. Adjacent their forward ends, the guide blocks are cut away as shown in phantom in Fig. 5 to receive the center frame post 23 so that the forward ends of the blocks engage the top rail 22 of the center frame to limit forward movement of the center panel. To enable the forward panel edge 30 to overhang the top rail of the center frame as shown in Fig. 6, the forward ends of the guide blocks are spaced inwardly from this edge.

To locate the end frames 21 properly with respect to the counter 16, abutments or stops 41 on the undersides of the end panels 17 engage and limit inward swinging of the end frames 21 about their hinges 26 to positions in which the outer ends of the end panels are flush with the outer sides of the rails of the end frames as shown in Fig. 8. Herein, these stops are the flat outer ends of small blocks 42 fastened as by screws to the undersides of the end panels 17 and spaced from the outer ends 32 of the latter. Dowels or pins 43 projecting horizontally and inwardly from the rails 22 of the end frames 21 are received in recesses in the blocks and cooperate with the latter to provide interlocks between the end frames and the counter for holding the latter against movement rearwardly away from the center frame 19 and upwardly with respect to the end frames 21. Rearward swinging of the intermediate frames 20 relative to the end panels 17 is limited by abutment blocks 47 (see Fig. 10) spaced inwardly from the forward edges 30 of the end panels 17 and depending from the undersides of the latter to engage the top rails 22 of the intermediate frames.

The front side of the body 15 is covered by an elongated sheet 44 (Fig. 11) of flexible material such as canvas extending horizontally across the frames 19, 20 and 21 and spanning the upper and lower rails 22 of the latter. In accordance with another aspect of the invention, opposite end portions 45 and 46 of the flexible sheet are extended around the posts 23 or outer ends of the respective end frames 21 and are connected to resilient elements 48 (Figs. 5 and 10) which act between the body and the sheet to hold the latter tight against the frames and also to urge the end frames inwardly toward each other and into engagement with the stops 41 on the counter. To avoid undue shifting of the sheet relative to the frames, the end portions 45 and 46 of the sheet preferably are formed as separate strips mounted on the respective intermediate frames 20 and the adjacent end frames. A third or center strip 49 completing the sheet is mounted separately on the center frame 19.

In the present instance, the end strips 45 and 46 are secured at their inner ends to the rear sides of the inner posts 23 on the respective intermediate frames 20 by screws extending through eyelets 50 (Fig. 7) spaced along the ends of the strips. From the rear side of its associated intermediate frame, each end strip extends horizontally across the front of the latter between the rails 22 thereof, then passes around the outer post of the frame and onto the front of the adjacent end frame 21, and finally is bent around the post 23 of the latter and then reversely so as to lie along the rear side of the post of the end frame. There, the end portion 51 of the strip is attached to the ends of the tension elements 48 (Figs. 5 and 10), herein coiled contractile springs, which are anchored as by screw eyes at their other ends on the outer post 23 of the intermediate frame. The points of anchorage of the springs are spaced inwardly from the hinge 26 for the end frames as shown in Fig. 10 so as to urge the frame inwardly about the axis of the hinge.

To provide uniform tension at substantially all points along the end portion 51 of each of the end strips 45 and 46, the end portion is looped around an elongated rigid rod 52 connected by screw eyes to the springs 48. The joint between the center frame 19 and the intermediate frames 20 may be hidden by looping the other end portion 53 of each strip around a similar rigid rod 54 (Fig. 7) which also serves to maintain the latter end portion of the strip smooth, the ends of each loop being sewn together as shown in Fig. 7.

The center strip 49 covering the center frame 19 extends horizontally across the latter between the rails 22 and, at opposite ends is folded around the end posts 23 to lie along the rear side of the posts where they are clamped against the latter by screws extending through eyelets 55 spaced along the strip ends. If desired, horizontal edge portions of the center strip intermediate the strip ends may be fastened by screws to the rails 23 as shown in Fig. 4. To hide the upper and lower edges of the three strips 45, 46 and 49, recesses 56 (Figs. 4, 6 and 9) are formed in the rear side of the lower edges of the upper rails and the upper edges of the lower rails of each frame.

In their collapsed conditions shown in Figs. 2 and 9, the counter 16 and the body 15 may be secured easily together for transporting the bar from place to place. This is accomplished with a single clamping member 58 when the counter is laid flat against the back of the body with the center panel 18 and the center frame 19 straddling the other panels and frames of the counter and the body. Herein, the clamping member 58 is a flexible strap secured intermediate its ends to the rear side of the center post 23 of the center panel and having a buckle 59 on one end adapted to receive the other end portion 60 (Fig. 9) after the latter has been passed around the collapsed counter. A loop 61 intermediate the ends of the belt constitutes a handle for carrying the bar.

To assemble the bar from the collapsed carrying condition shown in Figs. 2 and 9, the strap 58 is unbuckled to release the counter 16 from the body 15. Then, while the body is held in an upright position, the intermediate frames 20 are swung about their hinges 25 first rearwardly and away from the back of the center frame 19 and then outwardly and toward the plane of the latter until the surfaces 28 on the rails 22 of the center and intermediate frames engage each other in the extended positions of the intermediate frames. Since the latter extend rearwardly from the center frame in these positions, the feet 24 provide a four point support so that the body will now stand by itself, the end frames 21 remaining against the backs of the intermediate frames due to the action of the springs 48. Next, the bracket 36 is swung upwardly away from the center post 23 of the center frame and into its horizontal position with the toggle locked overcenter.

Next, while the body 15 is standing on its center and intermediate frames 19 and 20 with the end frames 21 in their collapsed positions, the end panels of the counter 16 are swung downwardly away from the bottom of the center panel 18 and into their extended positions in a common plane. The counter thus opened and disposed horizontally is advanced forwardly and edgewise toward the body and the bracket 36 is guided into the channel 40. Such forward movement of the counter is continued until the forward ends of the channel defining blocks 39 pass on opposite sides of the center post 23 and engage the top rail 22 of the center frame 19, the counter then being positioned properly with respect to the front wall center section. Next, the end frames 21 which are still lying against the backs of the intermediate frames are swung rearwardly and away from the latter and under the extended end panels of the counter. As the end frames approach the blocks 42 defining the stops 41, the counter is raised to permit the frames to pass under the blocks and then is lowered to rest on the tops of the frames and the bracket 36. Finally, with the end panels 17 of the counter resting on top of the end frames and after the intermediate frames have been moved rearwardly into engagement with the abutment blocks 47, the dowels 43 are guided into their recesses and the end frames are swung inwardly toward each other and into engagement with the stops 41. With the bar thus assembled, the springs 48 urge the end frames inwardly toward each other while tensioning the end strips 45 and 46.

To collapse the bar, the end frames 21 are swung first outwardly away from each other to release the dowels 43 from their recesses. Next, the counter 15 is raised slightly and the end frames are swung inwardly beneath the counter and against the backs of the intermediate frames 20. Then, the counter is moved edgewise and rearwardly away from the bracket 36 followed by folding of the end panels 17 inwardly against the back of the center panel 18 and collapse of the bracket downwardly against the center post 23 of the center frame 19. The folded counter is then put aside and the intermediate frames 20 are folded against the center frame 19 with the end frames 21 disposed in their recesses 29 as shown in Fig. 2. Next, the folded counter is laid flat against the intermediate frames 20 of the collapsed body and along the lower rails 22 of these frames as shown in phantom in Fig. 2 with the center frame 19 and the center panel 18 straddling the other frames and panels. Finally, the strap 58 is buckled to hold the counter and the body together.

It will be apparent that the novel bar described above can be assembled and disassembled by one person in a few simple operations. Due to the action of the springs 48, the end strips 45 and 46 are maintained taut to provide a pleasing appearance and the end frames are urged inwardly against the stops 41 to maintain the interlocked relation of the end frames and the counter. Such interlocking provided by the dowels 43 and the blocks 41 prevents movement of the counter 16 rearwardly away from the center and intermediate frames 19 and 20 and, in cooperation with the bracket 36, prevents movement of the counter upwardly away from the body. Thus, the bar, when assembled, is rigid enough to be transported simply by lifting upwardly on the center panel 18 of the counter. With the frames of the body interfitting in their collapsed positions to provide a small unit as permitted by their novel hinging arrangement and with the counter collapsible to a flat unit easily secured to the collapsed body, the bar provides a large working space while assembled and yet is collapsible to a size small enough to make it easily transportable.

I claim as my invention:

1. In a bar, the combination of, an upright framework comprising a rectangular center frame, rectangular intermediate frames narrower than said center frame and respectively hinged to the edges of the latter to fold against the back of the center frame, and rectangular end frames narrower than said intermediate frames and hinged to the outer edges of the latter to swing against the backs of the intermediate frames and lie between the latter and said center frame when the framework is collapsed, a counter adapted to rest at its front edge on said frame when the latter is extended with the end frames projecting rearwardly from the intermediate frames, stops at the ends of said counter engaged by said end frames and limiting the inward swinging thereof, a flexible sheet covering said frames and having end portions extending outwardly and around said intermediate and end frames and reversely around the outer edges of the latter, and resilient tensioning elements stretched between the ends of said sheet and the framework at points adjacent the hinges between said end and intermediate frames.

2. In a bar, the combination of, an upright framework comprising an upright center frame, rectangular intermediate frames respectively hinged to the edges of said center frame to fold against the back of the latter, and rectangular end frames hinged to the outer edges of said intermediate frames to swing against the backs of the latter when the framework is collapsed, a counter adapted to rest at its front edge on said frame when the latter is extended with the end frames projecting rearwardly from the intermediate frames, stops at the ends of said counter engaged by said end frames and limiting the inward swinging thereof, a flexible sheet covering said frames and having end portions extending outwardly and around said intermediate and end frames and reversely around the outer edges of the latter, and resilient tensioning elements stretched between the ends of said sheet and the framework at points adjacent the hinges between said end and intermediate frames.

3. In a bar, the combination of, an upright framework of generally U-shaped cross section having laterally spaced leg portions mounted on the closed end of the U for swinging toward and away from each other about vertical axes, a separately formed counter adapted to rest at its front edge on the top of said framework, stops at the ends of said counter engaged by said leg portions and limiting the inward swinging thereof, a flexible sheet covering the front side of said framework and having end portions extending outwardly and around said leg portions and then reversely around the outer edges of the latter, and resilient tensioning elements stretched between the ends of said sheet and said framework and acting to maintain the sheet taut on the front side of said framework and urge said leg portions thereof inwardly toward each other and into engagement with said stops.

4. In a bar, the combination of, two rectangular frame sections having front and rear sides and hinged together along adjacent side edges for swinging back and forth and into and out of collapsed positions in which the sections lie back to back, a strip of flexible material secured at one end to the other side edge of a first one of said sections and extending first across the front sides of the sections and then reversely around the other side edge of the second section and onto the back side of the latter, and resilient tension elements stretched between the other end of said strip and the back side of said first section at points adjacent the hinges between the sections and acting to maintain the strip taut across the front sides of the sections and to urge the latter toward their collapsed positions.

5. In a bar, the combination of, two flat frame sections pivotally connected together for swinging toward and away from each other and into and out of collapsed positions in which inner sides of the sections lie flat against each other, a strip of flexible material extending along and lying flat against the outer sides of said sections to form a covering therefor, and resilient means engageable with one end of said strip and acting between the latter and said sections to hold the strip taut against said outer section sides and urge the sections yieldably toward each other and into their collapsed positions, said strip being slidable relative to and along the outer side of one of said sections to permit swinging of the sections into said collapsed positions thereof.

6. In a bar, the combination of, an upright framework of generally U-shaped cross section having laterally spaced leg portions hinged on the closed end of the U for swinging toward and away from each other about vertical axes, an elongated flat removable counter disposed horizontally and resting at its front edge on the top of the framework, stops on the ends of said counter engaging said leg portions and limiting inward swinging thereof, means yieldably urging said leg portions toward each other and into engagement with said stops, interlocking members mounted on said counter ends and said leg portions and engageable with each other to prevent shifting of the counter ends vertically or horizontally relative to the leg portions when the latter engage said stops, means on the underside of said counter adjacent the center thereof defining guide surfaces extending transversely of the counter, and a guide member projecting rigidly and horizontally from said closed framework end and between said leg portions and engaging said guide surfaces to locate said counter and said framework relative to each other during assembly of the two by moving the counter horizontally toward the framework and, when the latter are assembled, to support the center of the counter and hold the same against separating movement away from the framework.

7. In a bar, the combination of, a first generally flat rectangular frame section adapted to stand in an upright position and comprising spaced horizontal rails and vertical posts spanning and secured to said rails at opposite ends and on inner sides of the rails, a second similar section narrower than said first section and having one of its posts hinged to one of said posts of the first section for swinging of the sections into and out of collapsed positions with the inner sides of the rails spaced apart in parallel planes and defining a generally flat rectangular recess extending vertically and disposed between the posts of said second section, and a third generally flat rectangular section comprising spaced horizontal rails spanned by and secured at one end to a vertical post and hinged at their opposite ends directly to the other post of said second section to swing against the inner side of the latter, said third section having a thickness equal approximately to that of said recess and, when collapsed against said second section, extending short of said hinged posts to fit into the recess without increasing the overall thickness of the collapsed bar.

8. In a bar, the combination of, an upright rectangular center frame having spaced horizontal rails spanned by and secured at opposite ends to vertical posts lying flat against inner sides of the rails, a pair of similar intermediate frames each having spaced horizontal rails spanned by and secured to upright posts with one of its posts hinged to one post of said center frame for swinging of the intermediate frames into collapsed positions against the inner side of the center frame with the hinged posts sandwiched between the rails of the frames, said hinged posts and the rails of said center frame and each of said intermediate frames cooperating to define a vertically extending recess when the intermediate frame is collapsed against the center frame, and two rectangular end frames respectively hinged to the other posts of said intermediate frames to swing against the inner sides of the latter and lie against said center frame when the intermediate frames are in said collapsed positions, said end frames extending short of said hinged posts of said center and intermediate frames and lying in said recesses to avoid increase of the overall thickness of the bar when the frames are in their collapsed positions.

References Cited in the file of this patent

UNITED STATES PATENTS

| | | |
|---|---|---|
| 336,110 | Hemingway | Feb. 16, 1886 |
| 728,673 | Clay | May 10, 1903 |
| 943,236 | Campbell | Dec. 14, 1909 |
| 1,048,701 | Johnson | Dec. 31, 1912 |
| 1,059,023 | Berry | Apr. 15, 1913 |
| 1,800,685 | Griffis | Apr. 14, 1931 |
| 1,898,998 | Glandt | Feb. 23, 1933 |